F. B. STEVENS.
Combined Screw and Lever Lifting Jack.
No. 223,301. Patented Jan. 6, 1880.
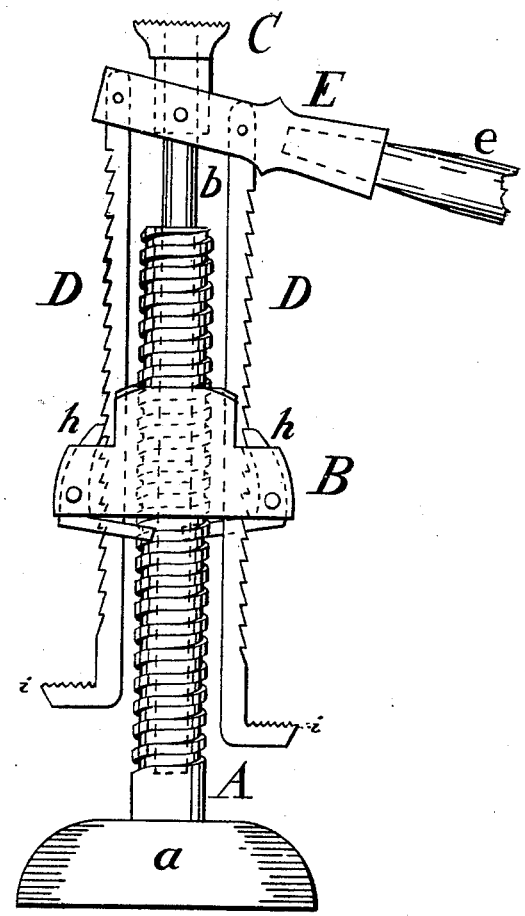
WITNESSES: INVENTOR:

UNITED STATES PATENT OFFICE.

FRANKLIN B. STEVENS, OF PORT HURON, MICHIGAN, ASSIGNOR TO WILLIAM SPRINGER AND ANTHONY BRUNK, OF SAME PLACE.

COMBINED SCREW AND LEVER LIFTING-JACK.

SPECIFICATION forming part of Letters Patent No. 223,301, dated January 6, 1880.

Application filed September 23, 1879.

*To all whom it may concern:*

Be it known that I, FRANKLIN B. STEVENS, of Port Huron, in the county of St. Clair, State of Michigan, have invented a certain new and useful Improvement in a Combined Screw and Lever Lifting-Jack; and I do hereby declare that the following is a full, clear, and exact description of the invention, which will enable others skilled in the art to which it pertains to make and use the same, reference being had to the accompanying drawing, and to the letters of reference marked thereon, which form a part of this specification.

*a* is the base. A is a threaded tube fastened into base *a*. B is a threaded nut to work on threaded tube A, and is also a casing for pawls *h h*. C is a swivel-cap. D D are racks attached to slotted lever E, and passing through casing B, held in position by pawls *h h*, which are to check backward action of racks D D when operated by lever E *e*. *b* is a rod attached to slotted lever E, passing into threaded tube A, to steady racks D D, and is the base to swivel-cap C.

The right-angled projections *i* on lower parts of racks D D are for lifting purposes when power cannot be applied by the cap C. The lower portions of pawls *h h*, when pressing upward on one or both, are for the purpose of throwing pawls *h h* clear of racks D D to lower racks D D to any desired point.

Having described my invention, what I claim, and desire to secure by Letters Patent, is—

The improved screw and lever jack consisting of the combination of racks D D, pawls *h h*, threaded nut and casing B, together with lever E and tube A, with sliding rod *b*, substantially as and for the purpose described.

In testimony that I claim the foregoing as my own I affix my signature in presence of two witnesses.

FRANKLIN B. STEVENS.

Witnesses:
 JACOB SPRINGER,
 MALCOLM MCKAY.